(12) United States Patent
Kriel

(10) Patent No.: US 8,025,154 B2
(45) Date of Patent: Sep. 27, 2011

(54) SCREEN PANEL FASTENER AND FASTENING ARRANGEMENT

(75) Inventor: Nigel Peter Kriel, Benoni (ZA)

(73) Assignee: Multotec Manufacturing (Pty) Limited (ZA)

( * ) Notice: Subject to any disclaimer, the term of this patent is extended or adjusted under 35 U.S.C. 154(b) by 272 days.

(21) Appl. No.: 12/095,264

(22) PCT Filed: Nov. 24, 2006

(86) PCT No.: PCT/IB2006/054419
§ 371 (c)(1),
(2), (4) Date: Oct. 14, 2008

(87) PCT Pub. No.: WO2007/060633
PCT Pub. Date: May 31, 2007

(65) Prior Publication Data
US 2009/0301944 A1    Dec. 10, 2009

(30) Foreign Application Priority Data
Nov. 28, 2005  (ZA) .................................. 2005/09574

(51) Int. Cl.
*B07B 1/49* (2006.01)
(52) U.S. Cl. ........ 209/405; 209/363; 209/399; 209/408; 209/409; 209/412
(58) Field of Classification Search ............... 209/399, 209/405, 408, 409, 412
See application file for complete search history.

(56) References Cited

U.S. PATENT DOCUMENTS

| 5,277,319 | A | * | 1/1994 | Henry, Jr. ...................... 209/399 |
| 5,377,846 | A | * | 1/1995 | Askew ........................... 209/405 |
| 5,769,241 | A | * | 6/1998 | Woodgate ...................... 209/399 |
| 6,253,926 | B1 | * | 7/2001 | Woodgate ...................... 209/399 |
| 6,964,341 | B2 | * | 11/2005 | Bacho et al. ................... 209/405 |
| 2005/0167341 | A1 | * | 8/2005 | Bacho et al. ................... 209/405 |
| 2009/0301945 | A1 | * | 12/2009 | Trench et al. .................. 209/405 |

FOREIGN PATENT DOCUMENTS

| DE | 8904258 | 5/1989 |
| WO | WO-03/066243 A1 | 8/2003 |
| WO | WO-2005/077551 A1 | 8/2005 |

OTHER PUBLICATIONS

International Search Report.

* cited by examiner

*Primary Examiner* — Terrell Matthews
(74) *Attorney, Agent, or Firm* — Henry B. Ward, III; Moore & Van Allen, PLLC

(57) ABSTRACT

The invention provides a fastener (10) for a screen panel (20), the fastener including a base section (12) at least two outer engagement means (14) extending from opposite side zones of the base section, the two outer engagement means at least partially opposing one another; and at least one inner engagement means (16) located between the outer engagement means; the inner and outer engagement means including retaining formations (14.2, 16.2) adapted to engage a complementary receiving formation in a screen panel (20) in a snap fit configuration.

21 Claims, 7 Drawing Sheets

SCREEN PANEL FASTENER AND FASTENING ARRANGEMENT

FIELD OF THE INVENTION

This invention relates to a fastener suitable for fastening a screen panel, and to a screen panel fastening arrangement including the screen panel fastener. More particularly, but not exclusively, the invention relates to a snap-fit fastener and to a complementary screen panel secured by the snap-fit fastener.

BACKGROUND TO THE INVENTION

Vibratory screening machines are well known in industry, and are frequently used for screening of particulate materials such as mineral ores encountered in the mining industry. In use, the particulate material is conveyed along a vibrating screen deck comprising a plurality of screen panels located adjacent one another on a supporting frame. The screen panels typically have screening apertures provided therethrough, which are suitably sized for allowing particles below a predetermined size to fall through the screen panel, whilst larger particles continue to travel on top of the screen panel.

Due to the nature of the screening process, the screen panels are prone to substantial wear, and it is required that the screen panels making up the screen deck be replaced from time to time. From a maintenance perspective, it is desirable for the replacement process to be as simple and quick as possible. However, existing fastening systems usually comprise a plurality of individual fastening elements that need to be removed and subsequently replaced, thus rendering the replacement process difficult and time consuming. Some existing fastening arrangements for instance comprise fasteners that urge the screen panel against the supporting frame by sandwiching the screen panels between the supporting frame and upper parts of the fastening members. Although this arrangement results in a sturdy and reliable fastening arrangement, it will be appreciated that replacement of the screen panels may be an time consuming process, as all the fastening members first need to be removed before the screen panels can be replaced, and conversely all fastening members must be replaced after the panels have been replaced. In addition to the adverse effect on replacement time, the removal and replacement of the fastening members may also result in loose parts getting lost during the replacement process.

OBJECT OF THE INVENTION

It is accordingly an object of this invention to provide a screen panel fastener and a fastening arrangement including such fastener, that will tend to alleviate the abovementioned disadvantages, and/or will provide a useful alternative to existing fasteners and fastening arrangements.

SUMMARY OF THE INVENTION

In accordance with the invention there is provided a fastener for a screen panel, the fastener including:
a base section:
at least two outer engagement means extending from opposite side zones of the base section, the two outer engagement means at least partially opposing one another; and
at least one inner engagement means located between the outer engagement means;
the inner and outer engagement means including retaining formations adapted to engage a complementary receiving formation in a screen panel in a snap fit configuration.

Preferably the inner engagement means extends from the one outer engagement means to the other outer engagement means so as to bridge the outer engagement means.

The engagement means may extend substantially perpendicularly from the base section.

Preferably the outer engagement means are substantially parallel and oppose one another, with the inner engagement means extending transversely between the opposing outer engagement means so as to bridge the opposing outer engagement means. More preferably, the inner engagement means is substantially perpendicular relative to the opposing outer engagement means.

In a preferred embodiment the base section and the engagement means extending therefrom define a head formation.

The inner engagement means preferably extends between central zones of the outer engagement means so as to render the head formation substantially H-shaped when viewed in plan.

The retaining formations may be in the form of flange-like lips extending sideways from upper ends of the engagement formations.

Preferably the flange-like lips extending from the outer engagement means extend towards one another so as to render at least part of the head formation substantially C-shaped when viewed from an end thereof.

The flange-like lip extending from the inner engagement means may be continuous with the lips extending from the outer engagement means, and preferably projects in a direction perpendicular to the lips extending from the outer engagement means.

There is further provided for the inner engagement means to have two opposite sides, with flange-like lips extending from both sides in opposite directions.

At least a first or upper edge of each flange-like lip may be bevelled, and preferably a second or lower edge of each flange-like lip is also bevelled.

There is further provided for the fastener to include a connecting formation for connecting the fastener to a support frame, the connecting formation depending from the base section in a direction opposite the engagement means.

The connecting formation may be in the form of an expandable sleeve and pin configuration. Alternatively, the connecting formation may be in the form of a threaded bolt.

There is still further provided for the fastener to be integrally formed with a saddle member for a screen deck, as more fully described in South African patent No. 2004/1298, which specification is incorporated herein by reference.

In a preferred embodiment the engagement means extending from the base section of the fastener are made of a resilient material.

In accordance with a further aspect of the invention there is provided a screen panel, suitable for use with a fastener as described hereinbefore, the screen panel including:
a planar body having a plurality of apertures provided therethrough;
the planar body having a side section that, in use, is juxtaposed a side section of an adjacent screen panel;
the side section including an engagement formation configured and dimensioned to engage at least part of the fastener as described hereinbefore.

The engagement formation may include a recess and a skirt extending at least partially along the recess, the skirt being interrupted so as to form intermittent skirt sections having opposing ends at the interrupted sections.

Preferably flange-like lips extend sideways from the skirt sections into the recess.

Flange-like lips may extend from the opposing ends of the skirt sections, and preferably flange-like lips extending from opposing ends extend towards one another.

The flange-like lips may be adapted to in use engage the engagement formations of the fastener.

The flange-like lips may be of semi-circular profile.

In a preferred embodiment at least the side section of the screen panel may be made of a resilient material.

According to a further aspect of the invention there is provided a screen panel assembly including:
a frame structure;
a fastener of the type as described hereinbefore which is connectable to the frame structure; and
at least one screen panel of the type as described hereinbefore being connectable to the fastener in a snap-fit configuration.

BRIEF DESCRIPTION OF THE DRAWINGS

Preferred embodiments of the invention is described by way of non-limiting examples, and with reference to the accompanying drawings in which.

DETAILED DESCRIPTION OF THE INVENTION

Figure 1:
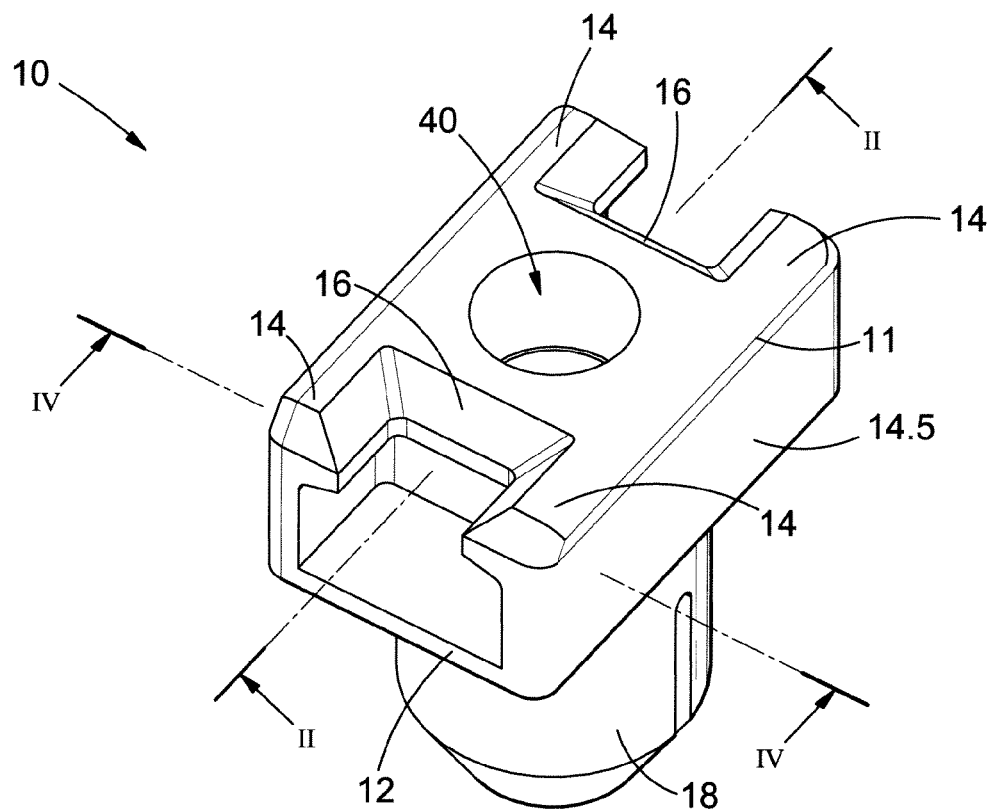
FIG. 1 is a perspective view of a fastener in accordance with the invention.

Referring to the drawings, in which like numerals indicate like features, a non-limiting example of the screen panel fastener in accordance with the invention is indicated by reference numeral 10. The fastener 10 includes a body member 11 having a base section 12 from which engagement means, 14 and 16, and a connecting formation 18 extends, and is adapted to connect a screen panel 20 to a frame structure 30 in a snap-fit configuration.

Figure 3:
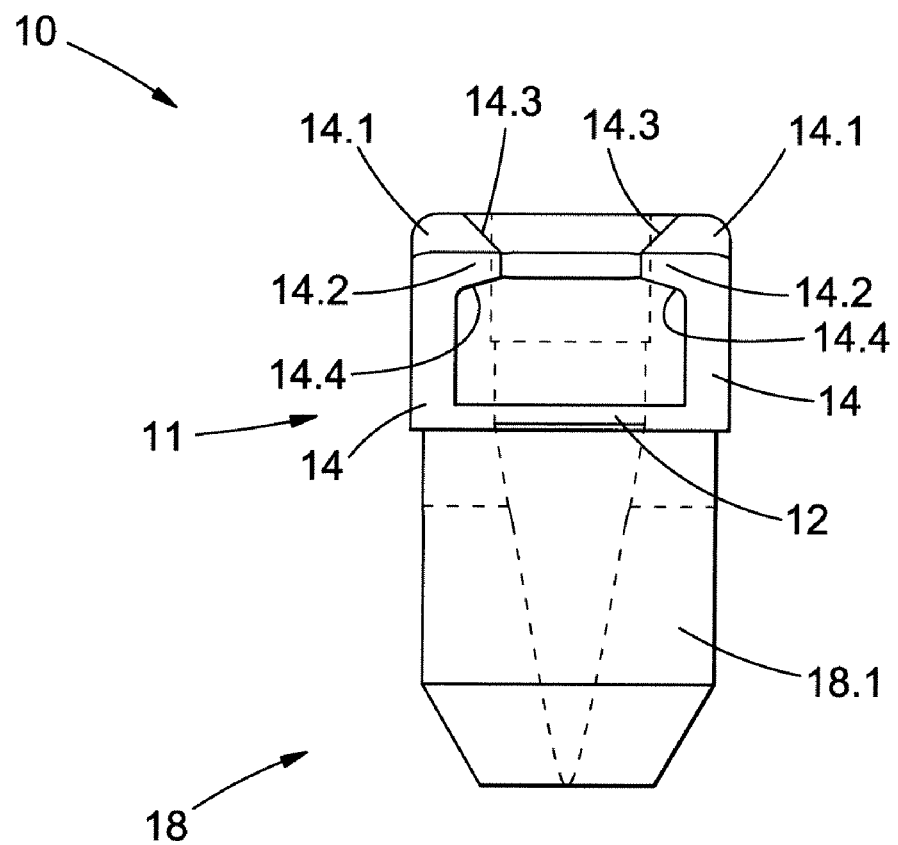
FIG. 3 is an end view of the fastener of FIG. 1.

FIG. 1 shows a first embodiment of the fastener 10 comprising a base section 12, a connecting formation 18 and a plurality of engagement means 14, 16. A pair of outer engagement means 14, in the form of sheet-like extensions, protrudes from outer zones of the base section 12, and is substantially perpendicular to the base section 12 and parallel to one another. As can be best seen in FIG. 3, each outer engagement means 14 has an upper end 14.1 from which a retaining formation 14.2 extends. The retaining formation 14.2 is in the form of a flange-like lip that extends sideways from the upper end 14.1 of the engagement means 14. The lips 14.2 extend towards one another so as to render the body member 11 of the fastener 10 substantially C-shaped when viewed from an end thereof. The lips 14.2 further include first 14.3 and second 14.4 bevelled edges.

The inner engagement means 16 can also be seen in FIG. 1, and in this embodiment is integrally formed with the outer engagement means 14. The inner engagement means extends perpendicularly from the base section 12, although it will be appreciated that the inner engagement means 16 may extend between the opposing outer engagement means 14 without being attached to the base section 12.

The inner engagement means 16 is normal relative to the outer engagement means 14, and extends between central parts 14.5 of the outer engagement means 14 so as to render the body member 11 substantially H-shaped when viewed in plan.

Figure 2:
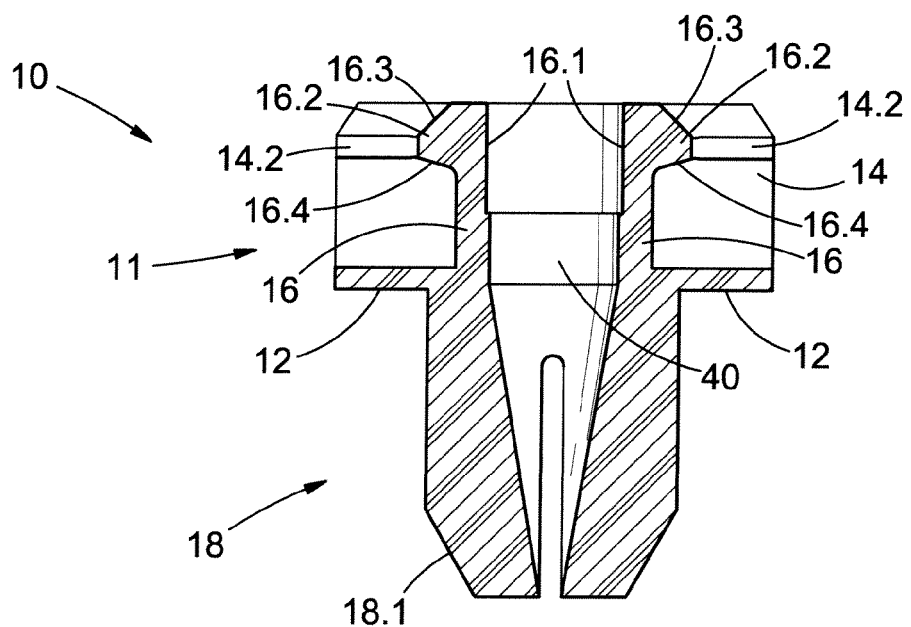
FIG. 2 is a cross-sectional side view of the fastener taken on line II-II of FIG. 1.

Referring to FIG. 2, retaining formations 16.2 in the form of flange-like lips extend sideways from upper ends 16.1 of the inner engagement means 16. The lips 16.2 extend from opposite sides of the inner engagement means 16, and each lip is continuous with the lip 14.2 extending from the adjacent outer engagement means 14 so as to form two continuous U-shaped retaining formations when viewed in plan. Depending on the type of connecting formation 18 used, the inner engagement means 16 may also include an aperture 40 for receiving a pin (not shown) of an expandable sleeve and pin mechanism.

In the particular embodiment described above the body member 11, comprising the base section 12 and the engagement means, 14 and 16, extending therefrom, constitute a discreet head formation, resulting in the use of a plurality of fasteners when securing the screen panel to the frame 30. The head formation is H-shaped when viewed in plan.

Figure 4:
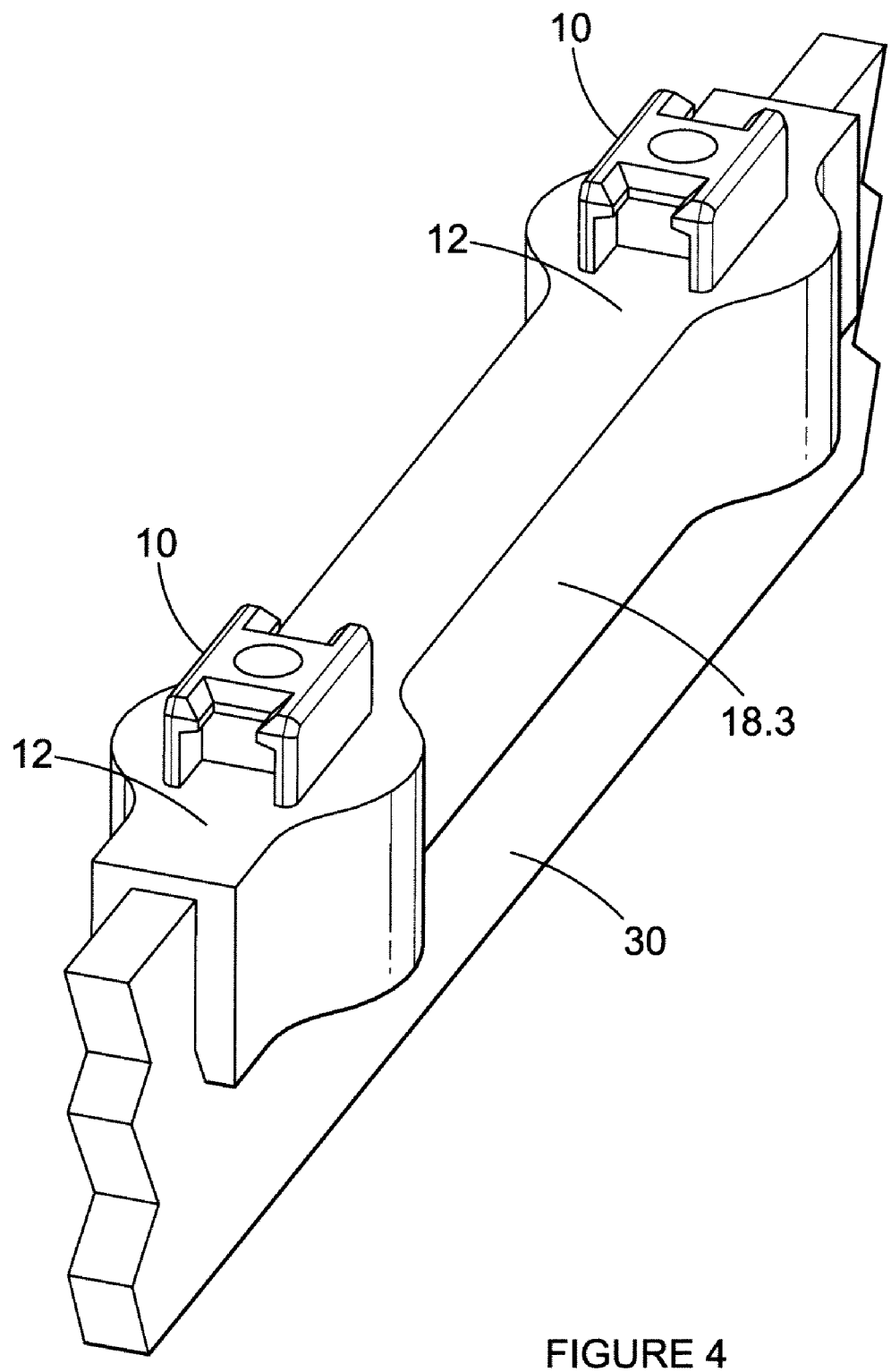
FIG. 4 is a perspective view of a further embodiment of the fastener in accordance with the invention.
Figure 5:
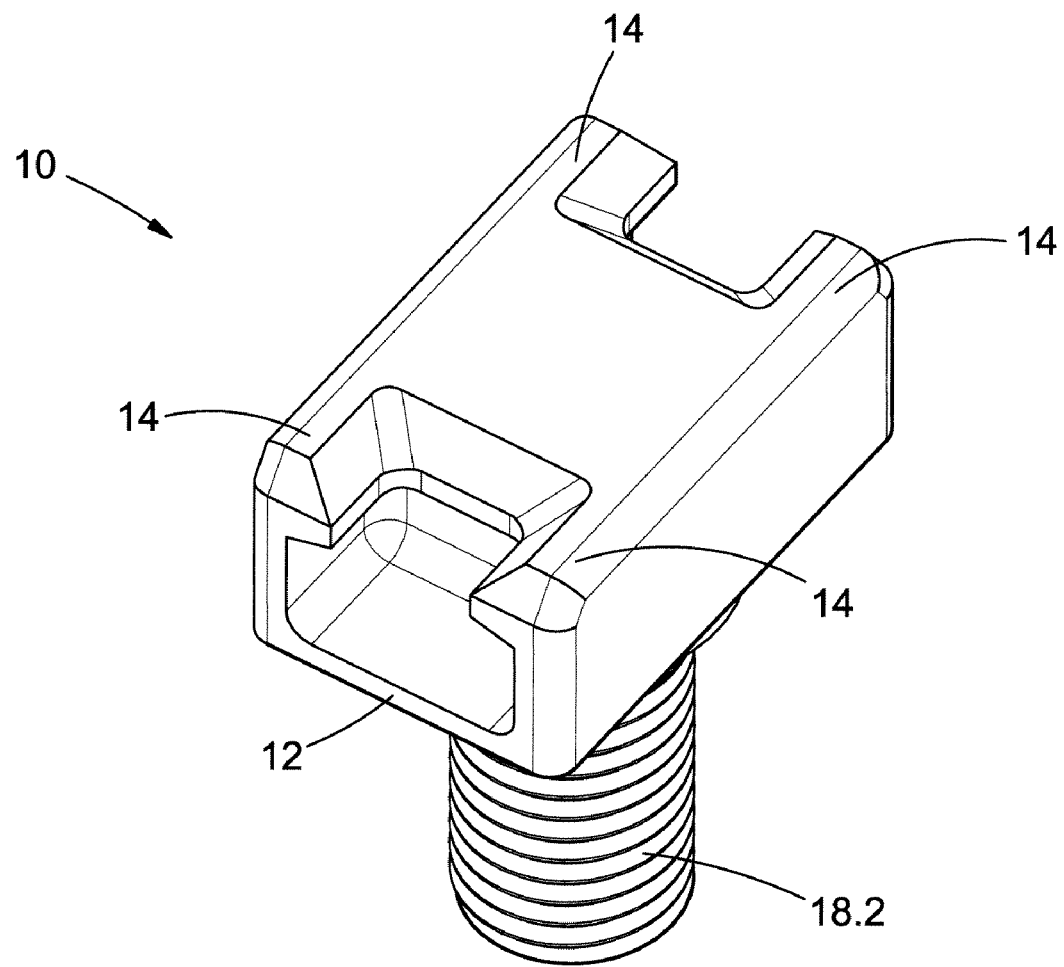
FIG. 5 is a perspective view of a still further embodiment of the fastener in accordance with the invention.

Various types of connecting formations 18 may be used in combination with fastener 10 as described hereinbefore. In FIG. 1 the connecting formation is in the form of an expandable sleeve and pin mechanism. FIG. 5 shows a connecting formation in the form of a threaded bolt 18.2. In FIG. 4 the fastener 10 is integrally formed with a saddle top 18.3 as described in more detail in the applicant's South African patent No 2004/1298, which specification is incorporated herein by reference. In this embodiment the saddle member forms the base section 12 of the fastener, and the inner 16 and outer 14 engagement means extend upwardly from an upper surface of the saddle member.

Figure 6:
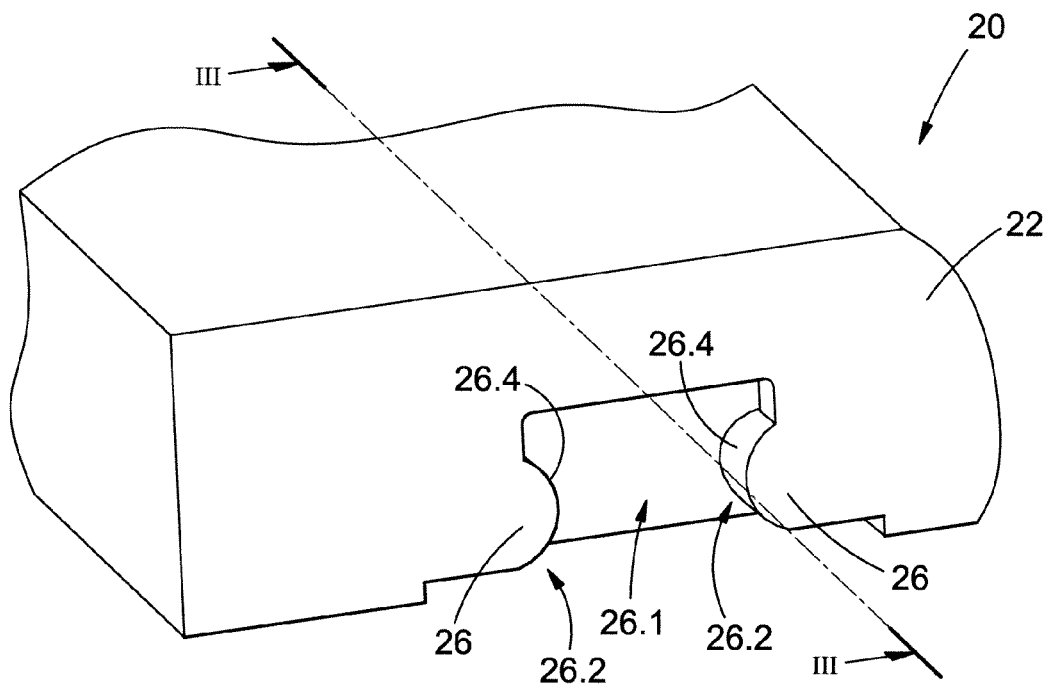
FIG. 6 is a perspective view of a part of a side section of a screen panel in accordance with the invention.
Figure 7:
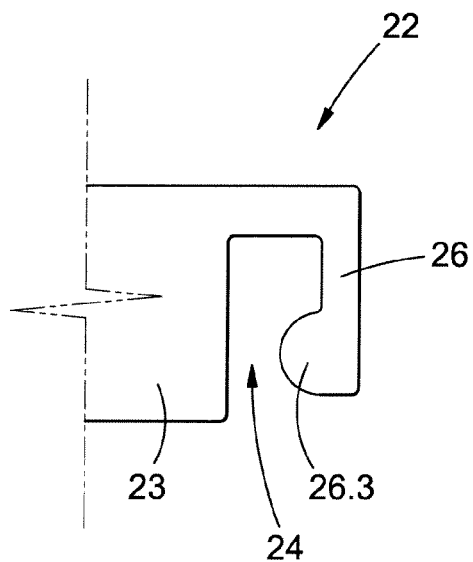
FIG. 7 is a cross-sectional view of the side section taken on line III-III of FIG. 6.

A part of a side section 22 of a screen panel 20 for use in combination with the fastener 10 is shown in FIGS. 6 and 7. The side section 22 includes a recess 24 formed between the body 23 of the screen panel 20 and a skirt 26 depending from an upper part of the side section 22. The recess 24 is of sufficient width for receiving the outer engagement means 14 therein. The skirt 26 is of an interrupted configuration, and a gap 26.1 is formed between opposing ends 26.2 of interrupted skirt sections 26. Retaining formations in the form of flange-like lips, 26.3 and 26.4, extend form the skirt in two directions. A first lip formation 26.3, shown in FIG. 7, extends into the recess 24, and in use engages the outer engagement means 14 on the fastener 10. A second lip formation 26.4, shown in FIG. 6, extends from ends 26.2 of the skirt. The second lip formations 26.4 extending from adjacent and opposing ends 26.2 extend towards one another, and in use engage the inner engagement means 16 on the fastener 10. The lip formations are substantially semi-circular when viewed in cross-section. In this particular example the lip formations, 26.3 and 26.4, extending form the skirt 26 is of semi-circular profile.

It will be appreciated that either the engagement means 14 and 16 of the fastener 10, or the skirt 26 extending from the side section 22 of the screen panel 20, or both, must be at least partially resilient in order for a resilient snap-fit connection to be made.

Figure 8:
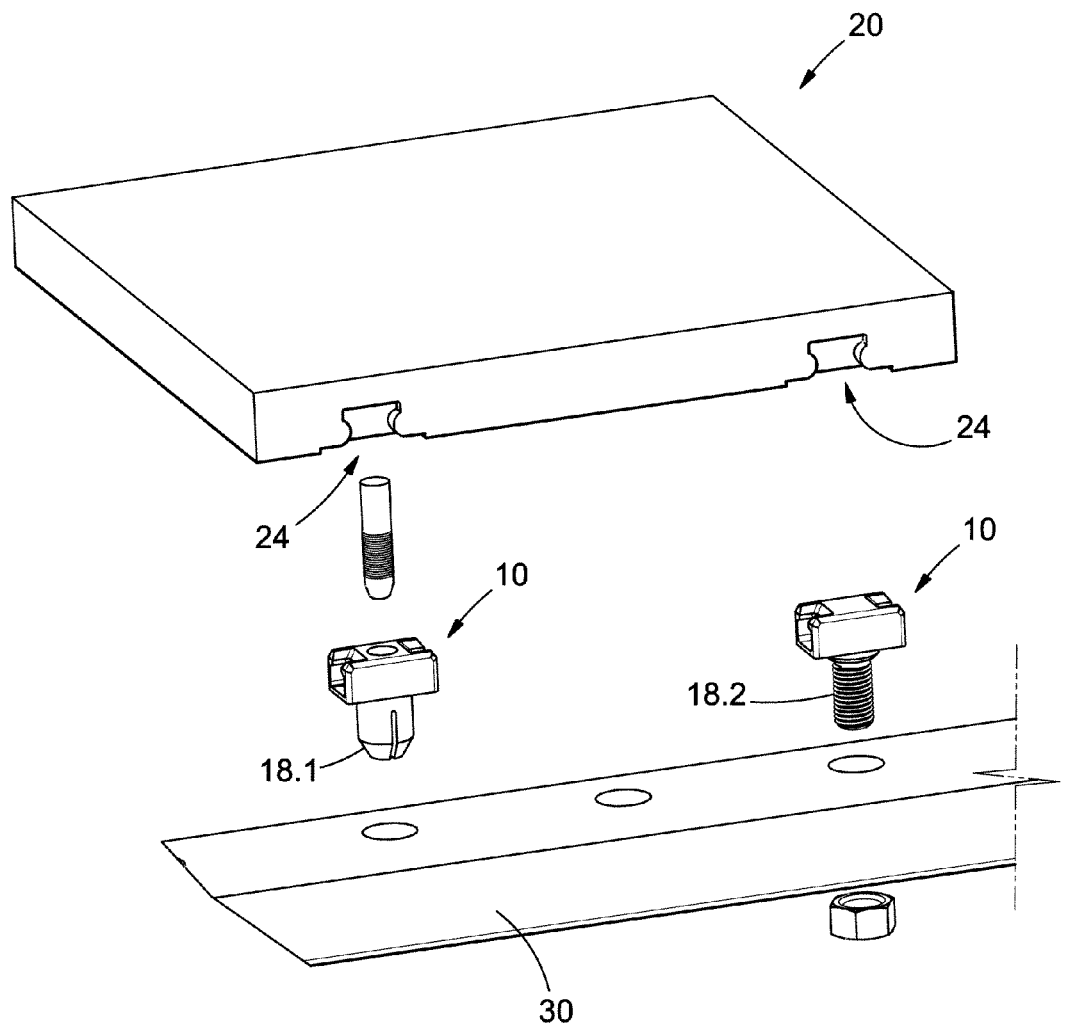
FIG. 8 is an exploded perspective view of the screen panel fastening arrangement in accordance with the invention.

In use, a plurality of fasteners 10 is connected to a frame structure 30, as shown in FIG. 8. The fasteners 10 are connected to the frame by way of any of the connecting formations 18 as described hereinbefore. Once the fasteners 10 have been mounted on the frame 30, the screen panels 20 are positioned above the fasteners 10 such that the engagement means 14, 16 are vertically aligned with the recesses 24. The screen panel 20 is subsequently forced onto the fasteners 10 by applying a downward force, and the engagement means 14 and 16, and more particularly the lip formations 14.2 and 16.2, engages the lip formations 26.3 and 26.4 extending form the skirt 26. Once the lip formations extending from the skirt 26 and fastener 10 respectively has traversed one another, a snap-fit connection is formed due to each lip formation acting as a restriction preventing a complementary lip formation from being dislodged. The screen panel can be removed by applying a pulling force that is sufficient to deform the lip formations in order for the engagement means to be dislodged from the recesses.

Figure 9:
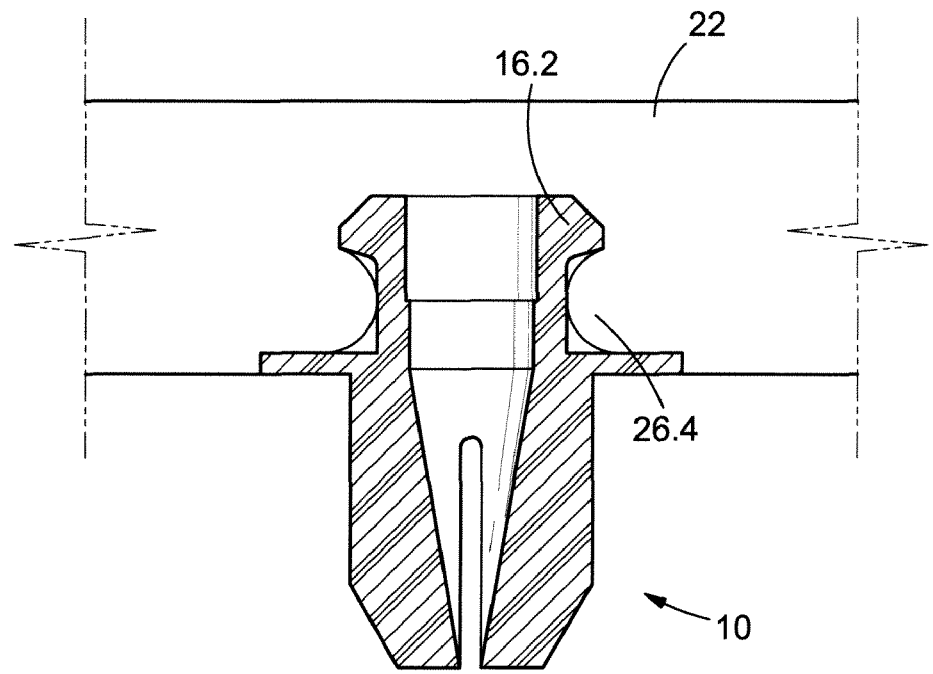
FIG. 9 is a cross-sectional side view of the fastener taken on line II-II of FIG. 1, with a screen panel connected thereto.
Figure 10:
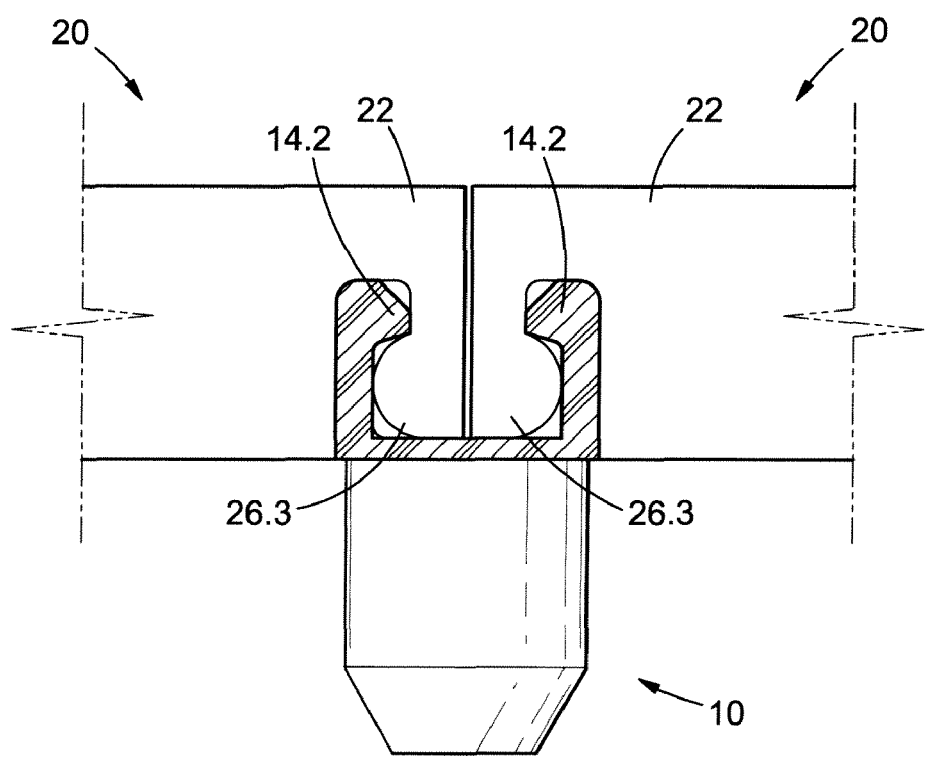
FIG. 10 is a cross-sectional end view of the fastener taken along line IV-IV of FIG. 1, with two adjacent screen panels connected thereto.

The assembled fastener and screen panel arrangement is shown in FIGS. 9 and 10. As can be seen in FIG. 9, the lips 16.2 extending from the inner engagement means 16 engage the lips 26.4 extending from the ends 26.2 of the skirt 26 of the screen panel, thus retaining the screen panel in a first direction. In FIG. 10, the lips 14.2 extending from the outer engagement means 14 engages the lips 26.3 extending form the skirt 26 into the recess 24, so as to retain the screen panel in a second direction, the first direction being normal to the second direction.

The fastening arrangement as described hereinbefore is advantageous in that the screen panel can be installed and removed by the mere application of a correctly applied pulling action, and it is not required to remove the fasteners during this operation. Also, each fastener grips the screen panel at multiple locations and in different directions, being at the lip formations extending into the recess, as well as the lip formations extending from the ends of the intermittent skirts. This dual gripping action enhances the integrity of the connection between the fastener and the screen panel, without hampering the installation and removal of the screen panel. The inner engagement means renders the screen more secure once connected in that the screen panel must be removed by peeling the screen panel, starting at a corner of the screen panel. This peeling action does not occur during normal operation, and is not induced by vibration, thus resulting in the screen panel being easy to remove when peeled in the correct manner, whilst still being securely connected in use. The inner engagement means also prevents the screen panel from being slideably displaced along the length of the fastener.

It will be appreciated that the above are only some embodiments of the invention, and that many variations may be possible without departing from the spirit and the scope of the invention. For example, the fastener does not have to have a discreet head section. The fastener may for instance be strip-like, with the outer engagement means being elongate, and the inner engagement means extending between the outer engagement means at predetermined intervals. Also, an upper surface of the fastener does not have to be planar, as there is provided for the upper surfaces of the fastener, and thus the engagement means, to be arcuate, and more particularly concave or convex. The exact location and orientation of the recess and skirt relative to the side section of the screen panel can also differ without impacting on the functionality of the invention. The lip formations may also be of various profiles, provided that the arrangement is such that snap-fit functionality will be achieved.

The invention claimed is:

1. A fastener to be secured to a support structure for engaging an engagement formation of a screen panel so as to secure the screen panel to the support structure, the fastener comprising:
    a base section;
    at least two outer engagement means extending from said base section, said outer engagement means at least partially opposing one another; and
    at least one inner engagement means located between said outer engagement means; said inner and outer engagement means including retaining formations adapted to engage a complementary receiving formation in the screen panel in a snap fit configuration; and
    wherein said two outer engagement means are substantially parallel to one another and oppose one another, with said inner engagement means extending transversely between said opposing outer engagement means so as to substantially bridge said two opposing outer engagement means.

2. The fastener of claim 1 wherein said inner and outer engagement means extend substantially perpendicularly from said base section.

3. The fastener of claim 1 wherein said inner engagement means is substantially perpendicular relative to said outer engagement means.

4. The fastener of claim 1 wherein said inner and outer engagement means define a head formation.

5. The fastener of claim 4 wherein said inner engagement means extends between central zones of said outer engagement means so as to render said head formation substantially H-shaped when viewed in plan.

6. The fastener of claim 4 wherein said retaining formations are in the form of flange-like lips extending sideways from upper ends of said outer engagement means and said inner engagement means.

7. The fastener of claim 6 wherein said flange-like lips extending from said outer engagement means extend towards one another so as to render at least part of said head formation substantially C-shaped when viewed from an end thereof.

8. The fastener of claim 6 wherein said flange-like lips extending from said inner engagement means are continuous with said lips extending from said outer engagement means.

9. The fastener of claim 6 wherein said flange-like lips extending from said inner engagement means project in a direction perpendicular to said lips extending from said outer engagement means.

10. The fastener of claim 6 wherein said inner engagement means has two opposite sides, with said flange-like lips extending from both sides in opposite directions.

11. The fastener of claim 6 wherein said flange-like lips comprises a first or upper edge that is bevelled.

12. The fastener of claim 6 wherein flange-like lips comprise a second or lower edge that is bevelled.

13. The fastener of claim 1 further comprising a support frame and a connecting formation for connecting the fastener to said support frame, said connecting formation depending from said base section.

14. The fastener of claim 13 wherein said connecting formation is in the form of an expandable sleeve and pin configuration.

15. The fastener of claim 13 wherein said connecting formation is in the form of a threaded bolt.

16. The fastener of claim 1 wherein said base section comprises a saddle member.

17. The fastener of claim 1 wherein said outer engagement means extending from said base section of the fastener are made of a resilient material.

18. A screen panel suitable for being fastened to a support structure by way of a fastener, the screen panel comprising:
   a planar body having a plurality of apertures provided therethrough, said planar body having a side section that, in use, is juxtaposed a side section of an adjacent screen panel, said side section comprising an engagement formation configured and dimensioned to engage at least part of the fastener in a snap-fit configuration; and
   wherein said engagement formation comprises a recess and a skirt extending at least partially along said recess, said skirt being interrupted so as to form intermittent skirt sections having opposing ends at the interrupted sections, and wherein said engagement formation comprises flange-like lip formations extending sideways from said skirt sections into the recess and also from the ends of said skirt sections parallel to said recess.

19. The screen panel of claim 18 wherein said flange-like lip formations extend from opposing ends of said skirt sections, said flange-like lip formations extending from opposing ends of said skirt sections extending towards one another.

20. The screen panel of claim 19 wherein said flange-like lips are adapted, in use, to releasably engage the fastener.

21. A screen panel assembly comprising:
   a frame structure;
   a fastener which is connectable to the frame structure, said fastener comprising:
      a base section;
      at least two outer engagement means extending from said base section, said outer engagement means at least partially opposing one another; and
      at least one inner engagement means located between said outer engagement means; said inner and outer engagement means including retaining formations adapted to engage a complementary receiving formation in a screen panel in a snap fit configuration; and
      wherein said two outer engagement means are substantially parallel to one another and oppose one another, with said inner engagement means extending transversely between said opposing outer engagement means so as to substantially bridge said two opposing outer engagement means; and
   at least one screen panel being connected to said fastener in a snap-fit configuration, said at least one screen panel comprising:
      a planar body having a plurality of apertures provided therethrough, said planar body having a side section that, in use, is juxtaposed a side section of an adjacent screen panel, said side section comprising an engagement formation configured and dimensioned to engage at least part of the fastener in a snap-fit configuration; and
      wherein said engagement formation comprises a recess and a skid extending at least partially along said recess, said skirt being interrupted so as to form intermittent skirt sections having opposing ends at the interrupted sections, and wherein said engagement formation comprises flange-like lip formations extending sideways from said skirt sections into the recess and also from the ends of said skirt sections parallel to said recess.

* * * * *